(12) United States Patent
Marshall

(10) Patent No.: US 11,931,792 B2
(45) Date of Patent: Mar. 19, 2024

(54) METHOD AND APPARATUS FOR CLAMPING A CONTAINER DURING PROCESSING OPERATIONS

(71) Applicant: Belvac Production Machinery, Inc., Lynchburg, VA (US)

(72) Inventor: Harold James Marshall, Forest, VA (US)

(73) Assignee: BELVAC PRODUCTION MACHINERY, INC., Lynchburg, VA (US)

( * ) Notice: Subject to any disclaimer, the term of this patent is extended or adjusted under 35 U.S.C. 154(b) by 0 days.

(21) Appl. No.: 18/096,162

(22) Filed: Jan. 12, 2023

(65) Prior Publication Data

US 2023/0166316 A1 Jun. 1, 2023

Related U.S. Application Data

(63) Continuation of application No. 16/975,641, filed as application No. PCT/US2019/019446 on Feb. 25, 2019, now Pat. No. 11,565,304.

(Continued)

(51) Int. Cl.
*B23Q 3/00* (2006.01)
*B21D 51/26* (2006.01)
(Continued)

(52) U.S. Cl.
CPC ............ *B21D 51/2638* (2013.01); *B25B 5/14* (2013.01); *B26D 3/166* (2013.01); *B26D 7/02* (2013.01);
(Continued)

(58) Field of Classification Search
CPC .. B25B 11/00; B23Q 3/00; B23Q 3/06; B65D 41/04; B65D 41/00
See application file for complete search history.

(56) References Cited

U.S. PATENT DOCUMENTS

| 3,782,314 A | 1/1974 | Franek |
| 5,245,739 A | 9/1993 | Ross |

(Continued)

FOREIGN PATENT DOCUMENTS

| EP | 0 582 984 B1 | 9/1996 |
| JP | 6442738 A1 | 2/1989 |

OTHER PUBLICATIONS

International Search Report from International Application No. PCT/US2019/019446, dated Jun. 19, 2019.

(Continued)

*Primary Examiner* — Lee D Wilson
(74) *Attorney, Agent, or Firm* — NIXON PEABODY LLP

(57) ABSTRACT

A device for inhibiting rotational motion of an article to be processed comprises a pressure plate assembly including a generally ring-shaped guide assembly. The guide assembly has and at least two guide pins extending from a first side in a transverse direction. The guide assembly further includes at least two resilient devices positioned over a respective one of the at least two guide pins and a container guide having an aperture for receiving an open end of a container moving in a first direction and for aligning the open end with a processing device. The container guide is positioned adjacent to the first side of the pressure plate assembly. At least two resilient devices are configured to be compressed in response to movement of the container guide in a first direction and are configured to decompress in response to movement of the container guide in a second, generally opposite direction.

23 Claims, 6 Drawing Sheets

Related U.S. Application Data

(60) Provisional application No. 62/635,782, filed on Feb. 27, 2018.

(51) Int. Cl.
    *B25B 5/14*     (2006.01)
    *B26D 3/16*     (2006.01)
    *B26D 7/02*     (2006.01)

(52) U.S. Cl.
    CPC .. *B21D 51/2692* (2013.01); *B65G 2201/0252* (2013.01)

(56) References Cited

U.S. PATENT DOCUMENTS

| | | |
|---|---|---|
| 5,473,855 A | 12/1995 | Hidding |
| 7,818,987 B2 | 10/2010 | Marshall |
| 7,950,259 B2 | 5/2011 | Marshall |
| 11,565,304 B2 * | 1/2023 | Marshall ................... B25B 5/14 |
| 2006/0108729 A1 | 5/2006 | Siegal |
| 2007/0227320 A1 | 10/2007 | Marshall |
| 2015/0344237 A1 | 12/2015 | Papsdorf |
| 2019/0344322 A1 * | 11/2019 | Mercer ................... B21D 37/04 |
| 2020/0406336 A1 * | 12/2020 | Marshall .............. B21D 51/263 |
| 2023/0166316 A1 * | 6/2023 | Marshall ................... B26D 7/02 72/94 |

OTHER PUBLICATIONS

Office Action issued in Japanese Application No. 2020-567454, dated Oct. 31, 2020 (6 pp.).

* cited by examiner

METHOD AND APPARATUS FOR CLAMPING A CONTAINER DURING PROCESSING OPERATIONS

CROSS-REFERENCE TO RELATED APPLICATIONS

The application is a continuation of U.S. application Ser. No. 16/975,641, filed Aug. 25, 2020, now allowed, which is a U.S. National Stage of International Application No. PCT/US2019/019446, filed Feb. 25, 2019, which claims priority to and benefit of U.S. Provisional Patent Application No. 62/635,782, filed Feb. 27, 2018, each of which is hereby incorporated by reference herein in its entirety.

TECHNICAL FIELD

The present disclosure relates generally to systems, methods, and devices for forming or processing an article of manufacture. More particularly, aspects of this disclosure relate to methods and apparatus for reducing or eliminating rotational forces applied to articles or containers, such as bottles and cans, during processing operations.

BACKGROUND

In the container manufacturing industry, various approaches exist for fabricating and processing different container constructions, including bottles, cans, jars, and the like.

In the process of making a container (e.g., a can), several operations may create a rotational force applied axially on the can body. In particular, such forces may be undesirably applied during processes used in finishing the open end of the can such as, e.g., trimming, threading, curling, spin forming, and the like. These undesirable forces may result in defects to the containers such as, for example, an incomplete trim, malformed threads or curls, or the like.

Thus, it would be desirable to create an apparatus and method for reducing or eliminating rotational forces on a container during processing operations.

SUMMARY

According to one embodiment disclosed herein, a processing turret comprises a drive shaft and a starwheel having a plurality of pockets configured to hold a respective container. The plurality of pockets has a respective push plate at a first end and a rotatable processing device at a second, generally opposing end. Each of the push plates is configured to contact a closed end of an article. The processing turret further includes a pressure plate assembly positioned generally adjacent to each of the rotatable processing devices. The pressure plate assembly includes at least two resilient devices positioned over a respective at least two guide pins. When the processing turret is in a first position, the at least two resilient devices are compressed, and when the processing turret is in a second position, the at least two resilient devices are generally uncompressed. The distance between the push plate and the rotatable processing device is greater in the second position than in the first position.

According to another embodiment disclosed herein, a device for inhibiting rotational motion of an article to be processed comprises a pressure plate assembly including a generally ring-shaped guide assembly. The guide assembly has and at least two guide pins extending from a first side of the guide assembly in a transverse direction. The guide assembly further includes at least two resilient devices positioned over a respective one of the at least two guide pins. The device further includes a container guide having an aperture for receiving an open end of a container moving in a first direction and for aligning the open end of the container with a processing device. The container guide is positioned adjacent to the first side of the pressure plate assembly. At least two resilient devices are configured to be compressed in response to movement of the container guide in a first direction. The at least two resilient devices are configured to decompress in response to movement of the container guide in a second, generally opposite direction.

According to one method disclosed herein, a method of processing an article comprises providing a starwheel including a plurality of pockets. Each of the plurality of pockets includes a push plate contacting a closed end of the article at a first end and a rotating processing device at a second, generally opposing end. The method further includes providing an article guide having an aperture therein for receiving an opposing open end of the container and a generally ring-shaped guide assembly positioned between the rotating processing device and the article guide. The guide assembly includes at least two guide pins extending from the first side of the guide assembly in a generally transverse direction and at least two resilient devices positioned over a respective one of the at least two guide pins. The method further includes moving one of the push plate or the rotating processing device a first distance in a first direction toward the other of the push plate or the rotating processing device such that the open end of the article is moved through the article guide toward the rotating processing device. The method further includes further moving the push plate or the rotating processing device a second distance in the first direction such that a second portion of the article abuts an outer surface of the article guide, thereby moving the article guide toward the processing device independently of the rotating processing device. The second portion of the article has a diameter greater than a diameter of the aperture of the container guide. The method further includes, in response to the movement of the article guide independently of the second ram assembly, compressing the at least two resilient devices such that when the open end of the article is processed by the rotating processing device, rotational movement of the article is inhibited or prevented.

The above summary does not represent every embodiment or every aspect of the present disclosure. Rather, the foregoing summary merely provides an exemplification of some of the novel aspects and features set forth herein. The above features and advantages and other features and advantages of the present disclosure, which are considered to be inventive singly or in any combination, will be readily apparent from the following detailed description of the illustrated examples and the modes for carrying out the present invention when taken in connection with the accompanying drawings and the appended claims.

Figure 1A:
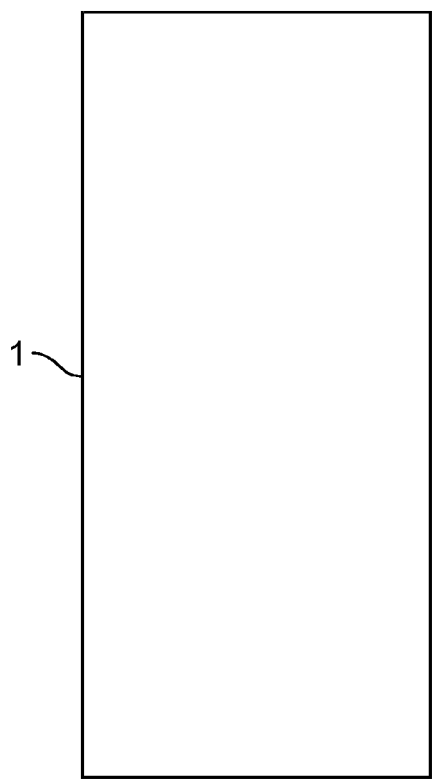
FIG. 1A is a side view of a container before the container enters a forming apparatus.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the invention as defined by the appended claims.

DETAILED DESCRIPTION OF ILLUSTRATED EXAMPLES

This disclosure is susceptible of embodiment in many different forms. There are shown in the drawings, and will herein be described in detail, representative embodiments, with the understanding that the present disclosure is to be considered as an exemplification of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed or logically prohibited, the singular includes the plural and vice versa, and the words "including," "comprising," or "having" mean "including without limitation." Moreover, words of approximation, such as "about," "almost," "substantially," "approximately," and the like, can be used herein in the sense of, for example, "at, near, or nearly at," or "within 3-5% of," or "within acceptable manufacturing tolerances," or any logical combination thereof. The drawings are provided for illustration purposes, and the features shown therein are not necessarily to scale.

A clamping device, as described herein, may be part of a separate machine or of one (or more) machine(s) in a machine line. Before discussing the specifics of the clamping device contemplated by the present disclosure, a brief description of a machine and machine line according to one embodiment will be briefly described.

Figure 1B:
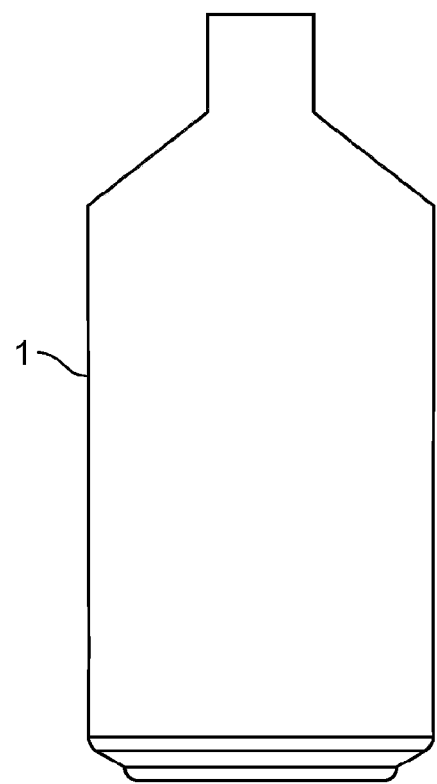
FIG. 1B is a front view of the container of FIG. 1A after the container exits the forming apparatus.

Machines may be used to form, process, or otherwise perform an action on a container 1 (see FIGS. 1A and 1B) such that the shape of the container 1 is modified from a first shape, such as that shown in FIG. 1A, to a second shape, such as that shown in FIG. 1B. In a multi-stage line, a container 1 is first fed into a first stage to enter pockets in a rotatable forming apparatus such as a turret/starwheel (see, e.g., FIGS. 2-3). Each starwheel may have any number of pockets to hold containers for processing and transfer. After exiting the first stage, the container 1 may enter a second stage to be further processed/formed.

Once fed into the multi-stage line, the container 1 is processed through any number of stages, e.g., a necking stage, a curling stage, a trimming stage, a threading stage, a spin forming stage, an expansion stage, and/or any other suitable process or forming stage or combination thereof. When the container passes through all process/forming stages, the container is discharged from the machine. In some embodiments, the multi-stage line may be a recirculating system or an in-line system.

Figure 2:
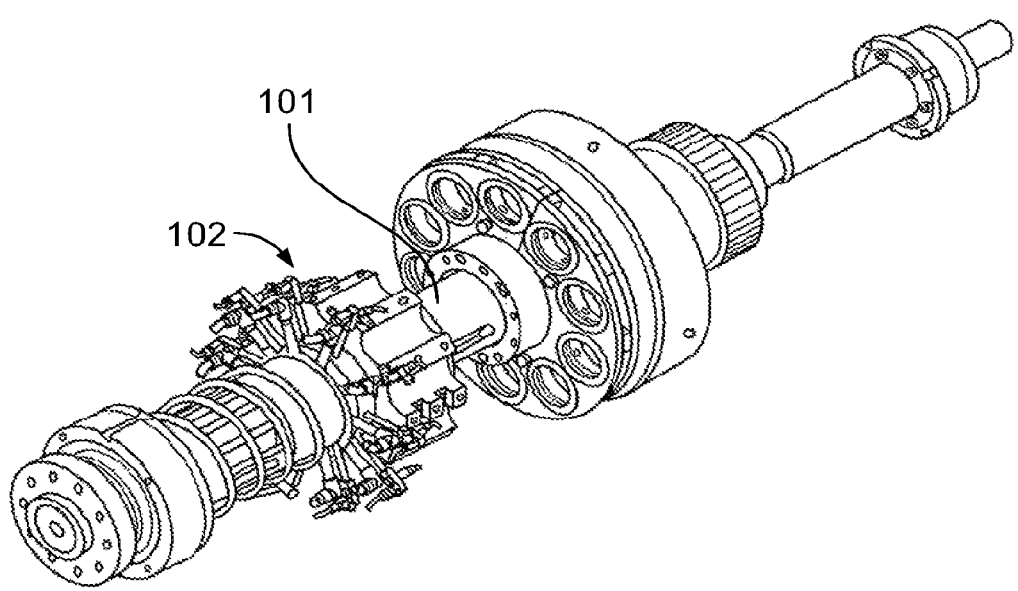
FIG. 2 is a perspective view of a portion of a rotatable forming apparatus according to one embodiment.
Figure 3:
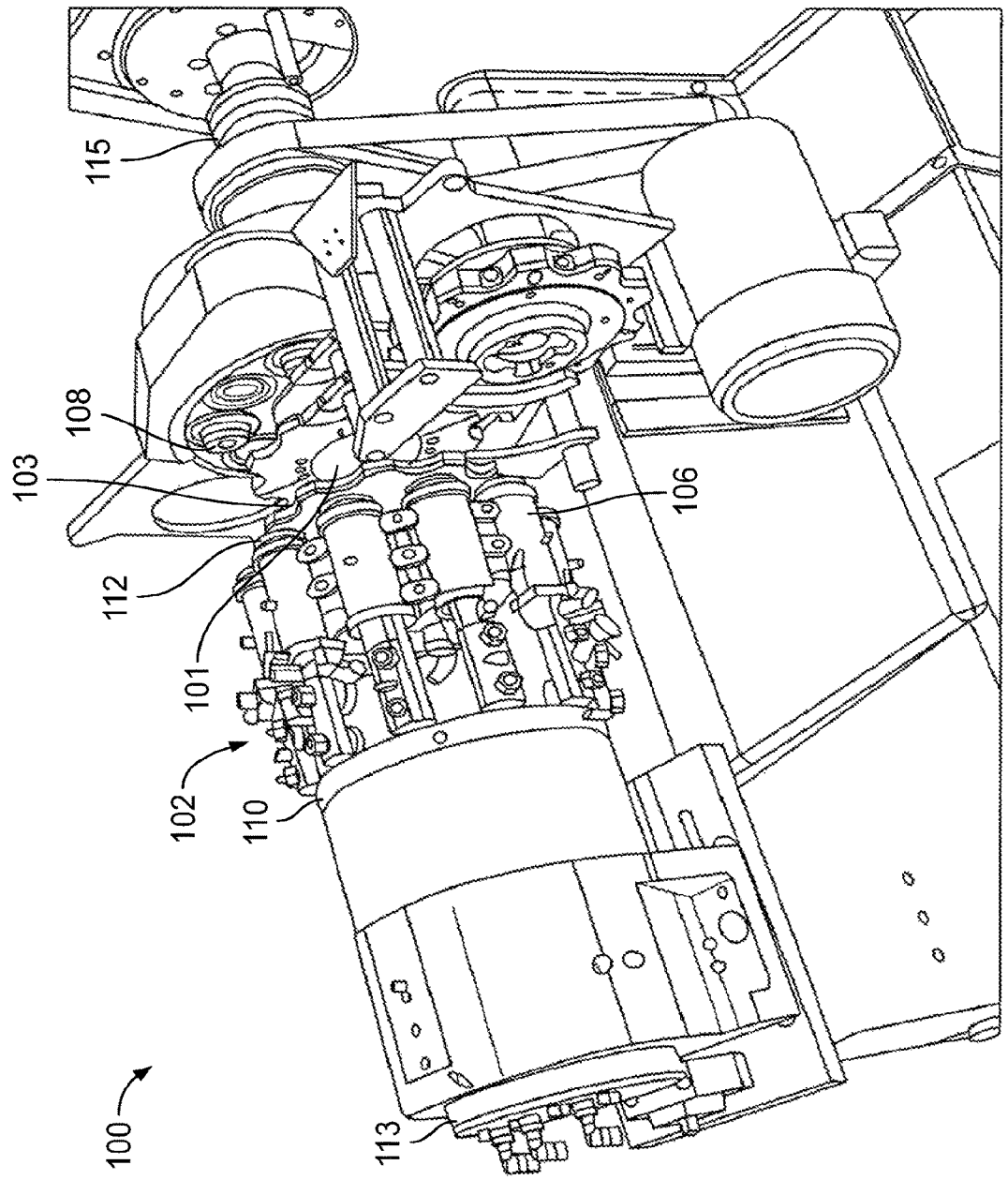
FIG. 3 is another perspective view of the rotatable forming apparatus of FIG. 2.

One example of a rotatable forming apparatus that may be used to modify a shape of a container 1 is shown in FIGS. 2-3 and described in U.S. Pat. No. 7,818,987, which is incorporated by reference herein.

Referring to the non-limiting embodiment of FIGS. 2-3, a rotatable forming apparatus or processing turret 100 may include a drive shaft 101 and a turret starwheel 102. The starwheel 102 includes a plurality of pockets 103 having a respective push plate 112 at one end and a rotatable processing device (e.g., a processing spindle 108) at the other end. The push plates 112 are configured to contact a bottom, closed end of the container 1. In the illustrated embodiment, the push plates 112 are positioned on respective push ram assemblies 106 for moving the container 1 toward the processing spindle 108. The starwheel 102 further includes a vacuum manifold 113 for delivering a vacuum to the push plates 112 to assist in holding the container 1, a cam (e.g., cam 110) to actuate one or more of the push ram assemblies 106, a driven gear to rotate the processing spindles 108, and/or an air manifold 115 to pressurize the container during processing, and the like. The push ram assemblies 106 of FIGS. 2-3 extend around and connect to the outer circumferential surface of the turret starwheel 102. The rotation of the turret 100 and the interaction between cam followers and the cam 110 cause the push ram assemblies 106 to slide relative to the drive shaft 101.

The turret starwheel 102 is coaxial with the drive shaft 101 and is configured to receive containers 1 from an infeed starwheel or a transfer starwheel. Transfer starwheels are configured to receive containers from the first stage process turret (e.g., forming turret assembly) and feed the container to the next stage process turret. The turret starwheel 102 may have any suitable number of components or pockets 103, which correspond with the number of push ram assemblies 106.

The push ram assemblies 106 are movable in a direction coaxial with the drive shaft 101. The push ram assemblies 106 hold and push the container 1 into a respective processing spindle 108 thereon in order to change the form/shape of the container 1. The processing spindle 108 may include, for example, a die or an expander. The die may be used to neck the container, while the expander may be used to expand the shape of the container. In other embodiments (not shown), the processing spindle may be coupled to a movable push ram assembly, and the processing spindle may be moved/pushed onto the container while the container is held generally stationary. In still other embodiments, both the container and the processing spindle are coupled to respective push ram assemblies and move toward one another.

Although the clamping device and methods utilizing the same described herein may be used with any suitable application where rotational forces are present and rotation of the container is not desirable, the apparatus and methods will be described herein with respect to a trimming device.

Figure 5A:
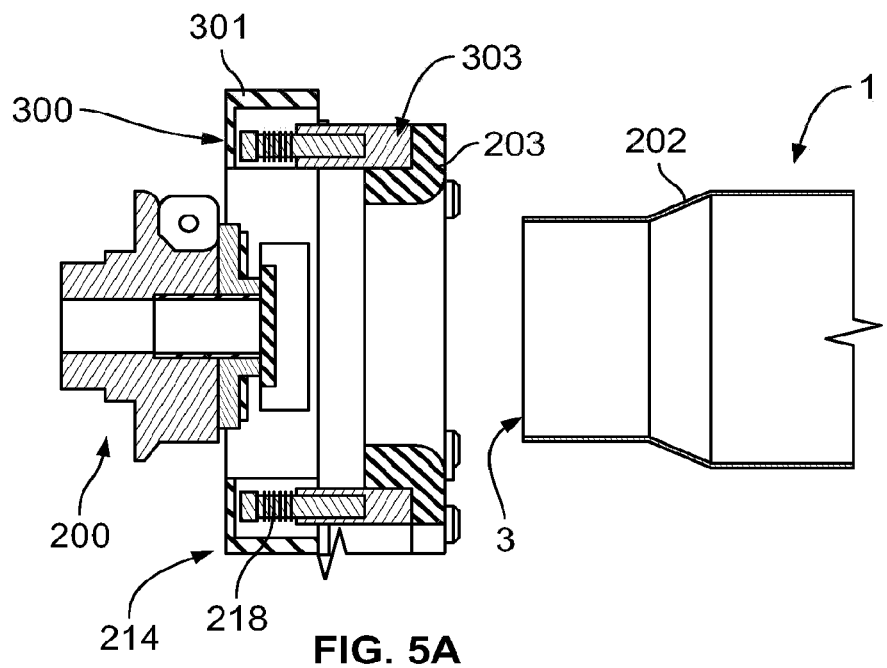
FIG. 5A is a cross-sectional view of a portion of the clamping device of FIG. 4 in an unclamped position according to one embodiment.
Figure 5B:
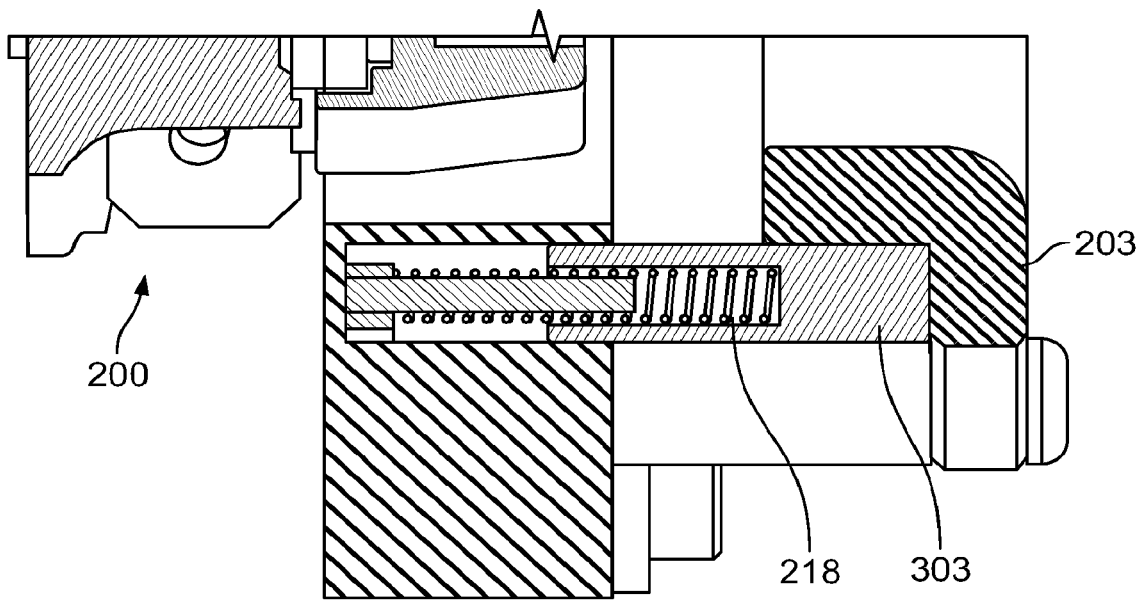
FIG. 5B is a close-up view of the spring assembly of the clamping device of FIG. 5A.
Figure 6:
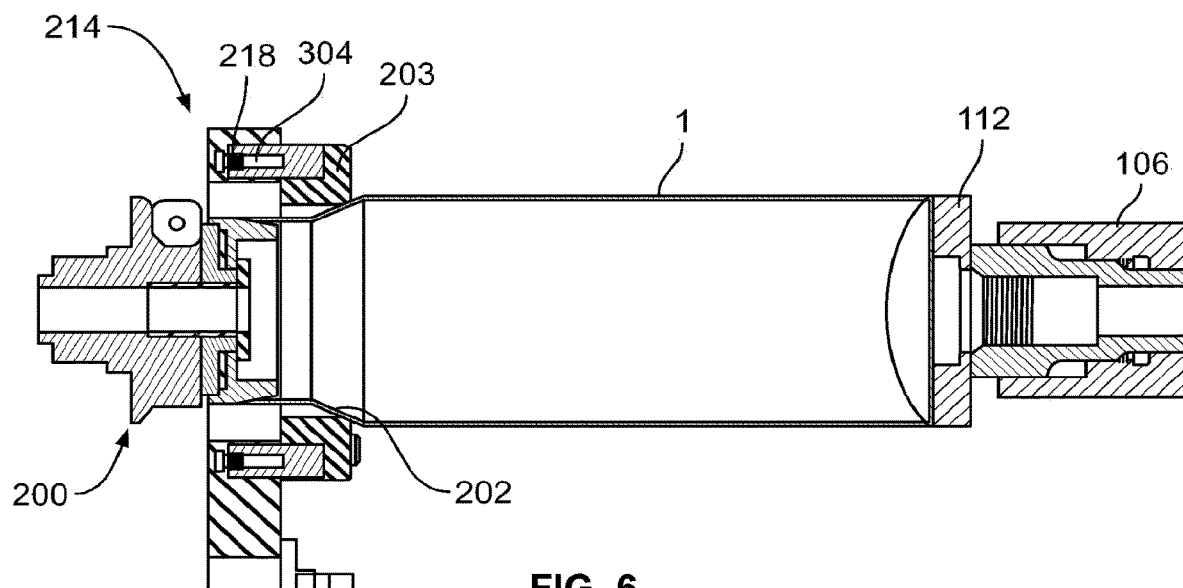
FIG. 6 is a cross-sectional view of the clamping device of FIG. 4 in a clamped position according to one embodiment.
Figure 7:
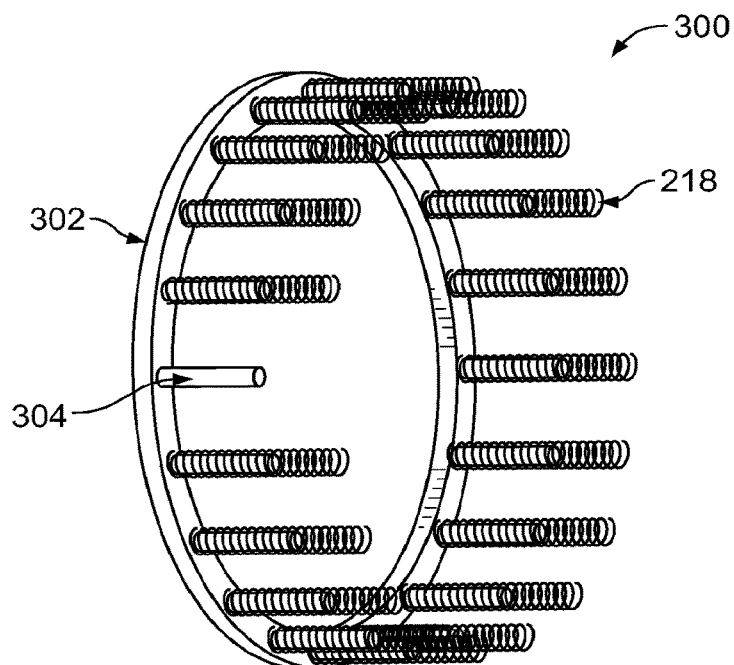
FIG. 7 is a perspective view of a spring guide assembly for use in the clamping device of FIGS. 4-6.

Referring to FIGS. 4-7, the clamping device 201 described herein is configured to "clamp" a container 1 that is sandwiched between a pressure plate assembly 214 (positioned generally adjacent to the processing device) and one of the push plates 112 such that rotation of the container 1 is inhibited or prevented. The clamping device 201 includes the pressure plate assembly 214 that is shown in use with and positioned adjacent to a trimmer head 200 according to one non-limiting embodiment. As shown in FIGS. 5a and 7, the pressure plate assembly 214 includes a mounting plate 301, a guide assembly 300, a spring holder 303, and a container or can guide 203. The mounting plate 301 is configured to receive a guide assembly (e.g., spring guide assembly 300) at a first end and further includes an aperture at an opposing second end for receiving at least a portion of the processing device (e.g., the trimmer head 200) therethrough. The spring guide assembly 300 is positioned between the rotating processing head and the container or can guide 203. The container or can guide 203 is positioned generally adjacent to the mounting plate 301.

As shown in FIG. 7, the spring guide assembly 300 includes a generally ring-shaped guide plate 302. Although in the illustrated embodiments, the guide plate 302 is generally ring-shaped, it is contemplated that the guide plate may have any other suitable shape. The guide plate 302 has at least two resilient devices (e.g., springs 218) positioned over respective at least two guide pins 304 extending from a first side of the spring guide assembly 300 in a transverse direction generally coaxial with the drive shaft 101.

The plurality of guide pins 304 are spaced generally uniformly along the spring guide assembly 300. A respective spring 218 is positioned over and around each of the guide pins 304. The inner diameter of the springs 218 is slightly larger than the outer diameter of the guide pins 304 such that the springs 218 may readily compress and expand, as described below. It is contemplated that any suitable number of guide pins and corresponding springs may be used. The amount and size of the springs 218 assist in determining the clamping force exerted on the container 1. In some embodiments, it may be desirable to increase the number of springs and to deflect them less to achieve a generally uniform clamping force and greater "spring life." The guide pins 304 and the springs 218 pass through apertures in the mounting plate 301 and the spring holder 303, as shown in FIGS. 4-6.

Use of the clamping device 201, according to one non-limiting embodiment, will now be described. FIG. 4 shows a push ram assembly 106 with a trimmer head 200 interfacing with an open end 3 of a container 1 to be trimmed. The trimmer head 200 of the illustrated embodiment constantly spins/rotates such that a wavy earring on the open end 3 of the container 1 resulting from prior forming processes, can be trimmed. In some embodiments, the trimmer head 200 spins at a relatively high rate of rotational speed.

Figure 4:
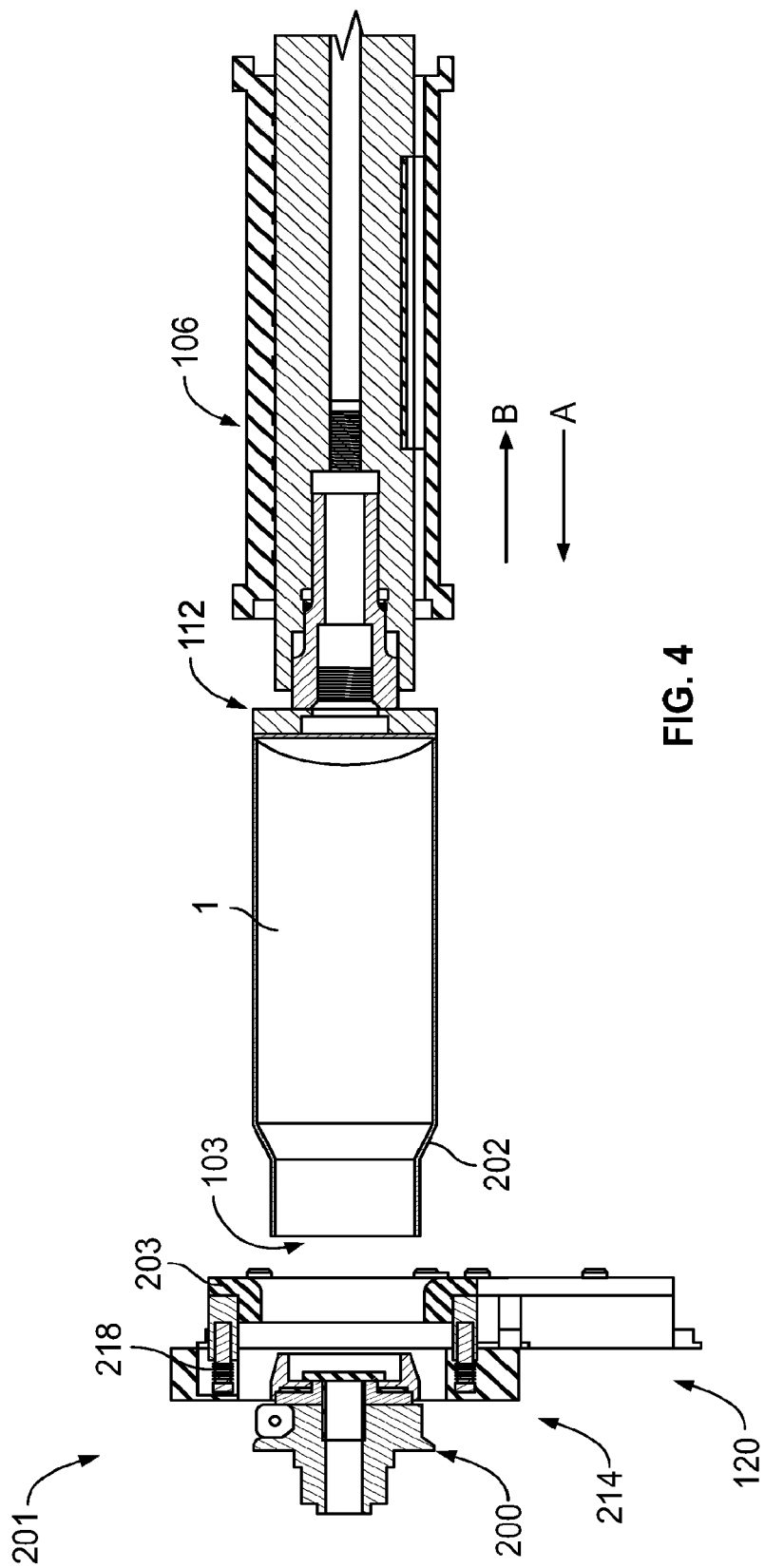
FIG. 4 is a cross-sectional view of a clamping device according to one embodiment.

When the clamping device 201 is in an unclamped position, as shown in FIGS. 4-5, the vacuum push plate 112 mounted to the push ram assembly 106 assists in holding the container 1. During the "push stroke," or the loading cycle of the trimming process, the body of the container 1 is moved axially at a controlled rate and distance in a first direction (e.g., in the direction of Arrow A, as shown in FIG. 4) from a first position towards/into the pressure plate assembly 214 and the rotating trimmer head 200 such that the open end of the container 1 is moved through the container or can guide 203 toward the rotating trimmer head 200 to a second position. The container or can guide 203 assists in aligning the open end 3 of the container 1 with the trimmer head 200.

Further movement of the push ram assembly 106 a second distance in the direction of Arrow A causes a shoulder 202 of the container, which has a larger diameter than the open end 3 of the container 1, to abut an outer surface of the container or can guide 203, thereby moving the container or can guide 203 from a second position toward the trimmer head 200. In response to this movement of the container or can guide 203, the springs 218 are compressed, thereby applying a clamping force to the container 1 between the pressure plate assembly 214 and the push plate 112. At full stroke of the push ram assembly 106, the turret 100 is in a first position wherein the springs 218 are compressed and a maximum clamping force may be obtained. The resulting clamping force inhibits or prevents the container 1 from rotating, and the container 1 may then be processed (e.g., trimmed). Inhibiting or preventing rotation of the container 1 during processing is desirable because it reduces the potential for defects. The distance between the push plate and the rotatable processing device is greater in the second position than in the first ("full stroke") position.

After the open end 3 of the container 1 is processed (e.g., trimmed), the push ram assembly 106 may then be retracted from the trimmer head 200 by moving by the vacuum push plate 112 coupled to the push ram assembly 106 in a second direction (e.g., in the direction of Arrow B, as shown in FIG. 4) into a second position in which the container 1 is moved away from the pressure plate assembly 214. In the second position, the springs 218 are uncompressed or decompressed, and the container 1 is no longer "clamped" between the pressure plate assembly 114 and the push plate 112.

In the illustrated embodiment of FIGS. 4-7, a plurality of coil springs 218 is used to generate the clamping force. It is contemplated, however, that the clamping force may be generated using other methods and apparatus including, but not limited to, wave springs (e.g., steel wave springs), polyurethane springs, compressible gas springs, other resilient devices, any combination thereof, or the like.

In some non-limiting embodiments, the push plate 112 is made of steel or another suitable metal or material. The push plate 112 may also or alternatively have a rubber compliant surface or insert that contacts the bottom end of the container 1 and assists in resisting the rotation of the container 1 during the trimming process. The push plate 112 may also or alternatively have an abrasive finish or coating on the contact surface for achieving the same purpose.

Although the embodiments described herein are discussed with respect to a trimming device, the clamping device may also be used for other applications where rotational forces are present and container rotation is not desirable. Such applications include, but are not limited to, threading, curling, spin forming, and the like.

The present invention is not limited to the precise construction and compositions disclosed herein; any and all modifications, changes, and variations apparent from the foregoing descriptions are within the spirit and scope of the invention as defined by the appended claims. Moreover, the present concepts expressly include any and all combinations and subcombinations of the preceding features and aspects.

What is claimed:

1. A processing turret, comprising:
   a drive shaft;
   a starwheel having a plurality of pockets configured to hold a respective article, the plurality of pockets having a respective push plate at a first end and a rotatable processing device at a second, generally opposing end, each of the push plates being configured to contact a closed end of an article; and
   a pressure plate assembly positioned generally adjacent to each of the rotatable processing devices, the pressure plate assembly including a generally ring-shaped guide assembly having at least two guide pins extending therefrom, the at least two guide pins having a respective at least two resilient devices positioned thereover, the guide assembly being configured to surround an open end of the article to be processed, wherein when the processing turret is in a first position, the at least two resilient devices are compressed, and wherein when the processing turret is in a second position, the at least two resilient devices are generally uncompressed, the distance between the push plate and the rotatable processing device being greater in the second position than in the first position.

2. The processing turret of claim 1, wherein when the processing turret is in the first position, the processing turret is configured to inhibit or prevent rotation of the article.

3. The processing turret of claim 2, wherein the article is configured to be processed by the processing device when the processing turret is in the first position.

4. The processing turret of claim 1, wherein the at least two resilient devices include coil springs, wave springs, polyurethane springs, compressible gas springs, or any combination thereof.

5. The processing turret of claim 1, wherein the at least two guide pins and the at least two resilient devices extend from the generally ring-shaped guide assembly in a direction generally coaxial with the drive shaft.

6. The processing device of claim 1, wherein the processing device is a trimming device, a threading device, a curling device, or a spin forming device.

7. The processing turret of claim 1, wherein a surface of the push plate contacting the closed end of the article includes an insert or an abrasive coating configured to inhibit rotation of the article.

8. The processing turret of claim 7, wherein the insert includes a rubber compliant surface.

9. The processing turret of claim 1, further comprising a vacuum manifold for delivering a vacuum between the push plate and the closed end of the article.

10. The processing turret of claim 1, wherein each of the push plates is positioned on a respective ram assembly movable in a direction generally coaxial with the drive shaft.

11. A device for inhibiting rotational motion of an article to be processed, the device comprising:
a pressure plate assembly including a generally ring-shaped guide assembly configured to surround an open end of the article to be processed, the guide assembly having at least two guide pins extending from a first side of the guide assembly in a transverse direction, the guide assembly further including at least two resilient devices positioned over a respective one of the at least two guide pins; and
an article guide having an aperture for receiving an open end of an article moving in a first direction and for aligning the open end of the article with a processing device, the article guide being positioned adjacent to the first side of the pressure plate assembly, the processing device being positioned generally adjacent to the pressure plate assembly;
wherein the at least two resilient devices are configured to be compressed in response to movement of the article guide in a first direction, and the at least two resilient devices are configured to decompress in response to movement of the article guide in a second, generally opposite direction.

12. The device of claim 11, wherein an inner diameter of the guide assembly is greater than an inner diameter of the article guide aperture.

13. The device of claim 11, further comprising a mounting plate configured to receive the guide assembly, the mounting plate further including an aperture for receiving at least a portion of the processing device therethrough.

14. The clamping device of claim 13, wherein the processing device is a trimming device, a threading device, a curling device, or a spin forming device.

15. The clamping device of claim 11, wherein the at least two resilient devices include coil springs, steel wave springs, polyurethane springs, compressible gas springs, or any combination thereof.

16. The clamping device of claim 11, wherein the at least two guide pins are three or more guide pins.

17. The clamping device of claim 11, further comprising a push plate configured to contact a closed end of the article and to assist in moving the article through the article guide,
wherein, in response to the compression, the pressure plate and the push plate are configured to impart a clamping force to the article, thereby inhibiting or preventing rotational movement of the article.

18. A method of processing an article, the method comprising:
providing a starwheel including a plurality of pockets, each of the plurality of pockets including a push plate contacting a closed end of the article at a first end and a rotating processing device at a second, generally opposing end;
providing an article guide having an aperture therein for receiving an opposing open end of the article and a generally ring-shaped guide assembly positioned between the rotating processing device and the article guide, the guide assembly including at least two guide pins extending from the first side of the guide assembly in a generally transverse direction and at least two resilient devices positioned over a respective one of the at least two guide pins;
moving one of the push plate or the rotating processing device a first distance in a first direction toward the other of the push plate or the rotating processing device such that the open end of the article is moved through the article guide and the ring-shaped guide assembly toward the rotating processing device;
further moving the push plate or the rotating processing device a second distance in the first direction such that a second portion of the article abuts an outer surface of the article guide, thereby moving the article guide toward the processing device independently of the rotating processing device, the second portion of the article having a diameter greater than a diameter of the aperture of the article guide; and
in response to the movement of the article guide independently of the second ram assembly, compressing the at least two resilient devices such that when the open end of the article is processed by the rotating processing device, rotational movement of the article is inhibited or prevented.

19. The method according to claim 18, further comprising, in response to movement of the push plate or the rotating processing device in a second, generally opposite direction, decompressing the at least two resilient devices.

20. The method of claim 18, wherein the at least two resilient devices include coil springs, steel wave springs, polyurethane springs, compressible gas springs, or any combination thereof.

21. The method of claim 18, wherein the processing device is a trimming device, a threading device, a curling device, or a spin forming device.

22. The method of claim 18, wherein the push plate includes an insert or an abrasive finish or coating configured to contact and inhibit rotation of the article.

23. The method of claim 18, wherein the first ram assembly moves in the first direction and the second ram assembly remains generally stationary.

\* \* \* \* \*